United States Patent [19]

Sato et al.

[11] Patent Number: 4,533,705

[45] Date of Patent: * Aug. 6, 1985

[54] PROCESS FOR PRODUCING α-OLEFIN POLYMERS

[75] Inventors: Akihiro Sato, Chibaken; Kazutsune Kikuta, Ichiharashi; Toshihiro Uwai, Ichiharashi; Kenji Matsuda, Ichiharashi; Nobutaka Hattori, Chibashi, all of Japan

[73] Assignee: Chisso Corporation, Osaka, Japan

[ * ] Notice: The portion of the term of this patent subsequent to Jan. 5, 1999 has been disclaimed.

[21] Appl. No.: 515,975

[22] Filed: Jul. 21, 1983

Related U.S. Application Data

[63] Continuation of Ser. No. 261,642, May 7, 1981, abandoned, which is a continuation-in-part of Ser. No. 225,436, Jan. 1, 1981, abandoned.

[30] Foreign Application Priority Data

Jan. 17, 1980 [JP] Japan ..................... 55-4009

[51] Int. Cl.$^3$ ..................... C08F 4/64; C08F 10/06
[52] U.S. Cl. ..................... 526/114; 502/108; 502/121; 502/123; 502/125; 502/126; 502/127; 526/65; 526/116; 526/119; 526/122; 526/127; 526/139; 526/141; 526/142; 526/348; 526/351; 526/352; 526/348.6; 526/901; 526/902; 526/904

[58] Field of Search ............... 526/114, 116, 119, 122, 526/127, 139, 141, 142

[56] References Cited

U.S. PATENT DOCUMENTS

| | | | |
|---|---|---|---|
| 4,136,243 | 1/1979 | Applegard et al. ................. | 526/140 |
| 4,210,729 | 7/1980 | Hermans et al. .................... | 526/142 |
| 4,235,747 | 11/1980 | Leung ................................ | 526/142 |
| 4,309,521 | 1/1982 | Sato et al. ......................... | 526/119 |

FOREIGN PATENT DOCUMENTS 2001549 12/1970 Fed. Rep. of Germany ...... 526/901

*Primary Examiner*—Edward J. Smith
*Attorney, Agent, or Firm*—Fred Philpitt

[57] ABSTRACT

A process for producing α-olefin polymers having high crystallinity and good particle form, with a high yield is provided. The polymerization therefor is carried out in the presence of a preactivated catalyst suitable particularly to gas phase polymerization or gas phase polymerization following slurry or bulk polymerization.

The catalyst is prepared by reacting a reduction solid prepared by reducing $TiCl_4$ with an organoaluminum compound, with an electron donor and an electron acceptor to obtain a solid product, and combining this solid product with an organoaluminum compound, an α-olefin and a reaction product of an organoaluminum compound with an electron donor.

5 Claims, No Drawings

PROCESS FOR PRODUCING α-OLEFIN POLYMERS

CROSS REFERENCE TO RELATED APPLICATION

This is a continuation of application Ser. No. 261,642, filed May 7, 1981, which is a continuation-in-part of Ser. No. 225,436, filed Jan. 1, 1981, both applications now abandoned.

BACKGROUND OF THE INVENTION (1) Field of the Invention

This invention relates to a process for producing α-olefin polymers, and more particularly, it relates to a process for producing α-olefin polymers having a high crystallinity and a good particle form, with a high yield, by employing a preactivated catalyst which is suitable for slurry polymerization, and particularly gas phase polymerization, and further, as modifications of gas phase polymerization, a combination of gas phase polymerization with slurry polymerization or bulk polymerization.

(2) Description of the Prior Art

It is well known that α-olefins are polymerized in the presence of so-called Ziegler-Natta catalysts comprising a transition metal compound of IV–VI Groups of the Periodic Table and an organometallic compound of I–III Groups of the Table, and also including those obtained by modifying the combinations of the above two compounds with an electron donor, etc.

As the α-olefin polymerizations in the presence of such Ziegler-Natta catalysts, the following have been well known:

slurry polymerization carried out in a solvent such as n-hexane (e.g. Japanese patent publication No. Sho 32-10596 (1957), etc.); bulk polymerization carried out in a liquefied monomer such as liquefied propylene (e.g. Japanese patent publications No. Sho 36-6686 (1961), No. Sho 38-14041 (1963), etc.); and gas phase polymerization carried out in a gaseous monomer such as gaseous propylene (e.g. Japanese patent publications No. Sho 39-14812 (1964), No. Sho 42-17487 (1967)). Further, processes of bulk polymerization followed by gas phase polymerization are also known (e.g. Japanese patent publication No. Sho 49-14862 (1974), Japanese patent application laid-open No. Sho 51-135987 (1976), etc.).

Among them, gas phase polymerization process has been advantageous in that the recovery and reuse of solvent as used in slurry polymerization process are unnecessary and the recovery and reuse of liquefied monomer such as liquefied propylene as in bulk polymerization process are also unnecessary; hence the cost for recovering solvent or monomer is low and it is possible to simplify the apparatus for producing α-olefin polymers.

However, gas phase polymerization process has been disadvantageous in that since the monomer inside the polymerization vessel is present in gas phase, the monomer concentration is lower than those of slurry polymerization process or bulk polymerization process which lowers the reaction rate; hence, in order to increase the polymer yield per unit weight of catalyst, it has been necessary to prolong the retention time and enlarge the reactor for that purpose, or in order to enhance the catalyst activity, it has been necessary to employ a modified organoaluminum compound, which results in reducing the stereoregularity of polymer.

Further, the gas phase polymerization process has had drawbacks in that the polymer particles are not uniform due to the unevenness of catalyst particles; during the polymerization, monomer oligomerization occurs and also cohesion of polymer particles occurs and further, removal of polymerization heat is so insufficient that cohesion and agglomeration of polymer particles are promoted, resulting in clogging in the port through which the polymer is discharged from the polymerization vessel as well as in the transporting line, and all these make a long term stabilized, continuous operation difficult. With respect to polyolefin product, too, the resulting polymer particles become rough, the dispersibility of stabilizer in the product is poor or the uniformity of quality of polyolefin product becomes also poor due to the dispersion of physical properties of individual polymer particles.

The present inventors have made studies for obtaining α-olefin polymers with a high yield, even in case of gas phase polymerization process wherein the monomer concentration is relatively low.

The object of the present invention is to provide a process for producing α-olefin polymers having a high crystallinity and a good particle form, with a superior yield, by employing a highly activated catalyst obtained by a preliminary activation (abbreviated hereinafter to "preactivation"), which catalyst, even when employed in gas phase polymerization, enables the polymerization to exhibit its advantages fully.

SUMMARY OF THE INVENTION

The present invention resides in:

a process for producing α-olefin polymers which comprises polymerizing α-olefin(s) in the presence of a preliminarily activated catalyst (abbreviated hereinafter to "preactivated catalyst") obtained by:

reacting a reduction solid prepared by reducing $TiCl_4$ with an organoaluminum compound, with an electron donor and an electron acceptor to obtain a solid product, and combining this solid product with an organoaluminum compound, an α-olefin and a reaction product of an organoaluminum compound with an electron donor.

The present invention enables particularly gas phase polymerization to fully exhibit advantages intrinsic of the polymerization, due to the high activity of the preactivated catalyst. Further, when slurry polymerization or bulk polymerization is carried out in combination with gas phase polymerization, it is also possible to carry out an advantageous polymer production wherein the advantages of each case are fully exhibited.

PREFERRED EMBODIMENTS OF THE INVENTION

In the reduction reaction of $TiCl_4$, an organoaluminum compound may be used in an amount of 0.05 to 10 mols, preferably 0.1 to 5 mols based on one mol of $TiCl_4$. Either one or both of the two compounds may be diluted with a solvent such as n-pentane, n-hexane, n-heptane, benzene, toluene, etc. and subjected to the reaction. The amount of the solvent used may be suitably 0.1 to 5 l based on one mol of the compounds to be diluted. The reaction may be carried out preferably at a reaction temperature of $-30°$ C. to $+100°$ C., preferably $-20°$ C. to $+80°$ C. and over a time of 30 minutes to 10 hours. Although there is no particular limitation to the mixing manner of TiCl4 and the organoaluminum compound, it is preferable to slowly and dropwise add either one of the compounds to another. At the time of the addition, too, the reduction reaction proceeds. The resulting reduction solid formed by the reduction reaction is a solid substance composed mainly of titanium trichloride, and subjected, as it is contained in the reaction liquid, to the subsequent step, or filtered off, washed with a solvent such as n-hexane and dried to obtain powder, which is then subjected to the subsequent step or further subjected to repeated additions of solvent by pouring and decantations and then subjected, as the resulting material is suspended in the solvent, to the subsequent step.

The organoaluminum compounds employed for the above reaction are those expressed by the general formula $AlR_nR'_{n'}X_{3-(n+n')}$
wherein R and R' each represent a hydrocarbon group such as alkyl group, aryl group, alkaryl group, cycloalkyl group or an alkoxy group; X represents a halogen atom of fluorine, chlorine, bromine or iodine or hydrogen atom; and n and n' each represent an optional number of $0 < n + n' \leq 3$. As concrete examples, trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methyl-pentylaluminum, tri-n-octylaluminum, tri-n-decylaluminum, dialkylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide; alkylaluminum hydrides such as diethylaluminum hydride; alkylaluminum sesqui- or di-halides such as methylaluminum sesquichloride, ethylaluminum sesquichloride, ethylaluminum dichloride, i-butylaluminum dichloride, etc. are mentioned. Besides, alkoxyalkylaluminums such as monoethoxydiethylaluminum, diethoxymonoethylaluminum may also be employed.

As for the solvent, inert solvents are employed such as aliphatic hydrocarbons e.g. n-pentane, n-hexane, n-heptane, n-octane, i-octane, etc., aromatic hydrocarbons e.g. benzene, toluene, xylene, etc., halogenated hydrocarbons e.g. carbon tetrachloride, chloroform, dichloroethane, trichloroethylene, tetrachloroethylene, etc. and the like.

The reduction solid is then reacted with an electron donor and an electron acceptor. As for the manner in which an electron donor and an electron acceptor are reacted with the reduction solid, the following ones are illustrated:

(1) a manner in which an electron donor is reacted with the reduction solid separated from unreacted titanium tetrachloride and organoaluminum compound by filtration or decantation; unreacted electron donor and a reaction product soluble in the solvent are removed by filtration or decantation; and thereafter an electron acceptor or an electron donor and an electron acceptor are added to effect reaction;

(2) a manner in which an electron donor is reacted with the above-mentioned reduction solid, leaving a part or all of unreacted electron donor; and an electron acceptor is then added to effect reaction;

(3) a manner in which an electron donor and an electron acceptor are almost simultaneously added to the above-mentioned reduction solid, or an electron donor and a reaction product of an electron donor with an electron acceptor are added thereto to effect reaction;

(4) a manner in which an electron acceptor is added to the above-mentioned reduction solid, followed by adding an electron donor to effect reaction;

(5) a manner in which the reduction reaction is carried out employing an excess of titanium tetrachloride; and an electron donor is added to a reaction slurry containing the resulting reduction solid and titanium tetrachloride, to effect reaction; and the like manners.

The proportion of amounts of the reduction solid, electron donor, electron acceptor and solvent employed at the time of the reaction, is usually in the ranges of 10 to 1,000 g of an electron donor, 10 to 5,000 g of an electron acceptor, and 0 to 5,000 ml of a solvent, each based on 100 g of the solid product.

The mixing and reaction temperatures of these are $-50°$ C. to $200°$ C., preferably $20°$ to $100°$ C. The reaction time is usually about 10 minutes to 10 hours.

As for the electron donors, organic compounds containing at least one atom of oxygen, nitrogen, sulfur and phosphorus, i.e. ethers, alcohols, phenols, esters, aldehydes, carboxylic acids, ketones, nitriles, amines, amides, ureas, thioureas, isocyanates, azo compounds, phosphines, phosphites, phosphinites, thioethers, thioalcohols, etc. are mentioned. As concrete examples, ethers such as diethyl ether, di-n-propyl ether, di-n-butyl ether, di-isoamyl ether, di-n-pentyl ether, di-n-hexyl ether, di-i-hexyl ether, di-n-octyl ether, di-i-octyl ether, di-n-dodecyl ether, diphenyl ether, ethylene glycol monomethyl ether, diethylene glycol dimethyl ether, tetrahydrofurane; alcohols such as methanol, ethanol, propanol, butanol, pentanol, hexanol, octanol; phenols such as phenol, cresol, xylenol, ethylphenol, naphthol; esters such as methyl methacrylate, ethyl acetate, butyl formate, amyl acetate, vinyl butyrate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate; aldehydes such as acetaldehyde, benzaldehyde; carboxylic acids such as formic acid, acetic acid, propionic acid, butyric acid, oxalic acid, succinic acid, acrylic acid, maleic acid, benzoic acid; ketones such as methyl ethyl ketone, methyl isobutyl ketone, benzophenone; nitriles such as acetonitrile; amines such as methylamine, diethylamine, tributylamine, triethanolamine, $\beta$(N,N-dimethylamino)ethanol, pyridine, quinoline, $\alpha$-picoline, N,N,N',N'-tetramethylhexaethylenediamine, aniline, dimethylaniline; amides such as formamide, hexamethylphosphoric acid triamide, N,N,N',N''-pentamethyl-N'-$\beta$-dimethylaminoethylphosphoric acid triamide, octamethylpyrophosphoroamide; ureas such as N,N,N',N'-tetramethyl urea; isocyanates such as phenyl isocyanate, toluyl isocyanate; azo compounds such as azobenzene; phosphines such as ethylphosphine, triethylphosphine, tri-n-butylphosphine, tri-n-octylphosphine, triphenylphosphine, triphenylphosphine oxide; phosphites such as dimethylphosphite, di-n-octylphosphite, triethylphosphite, tri-n-butylphosphite, triphenylphosphite; phosphinites such as ethyldiethylphosphinite, ethyldibutylphosphinite, phenyldiphenylphosphinite; thioethers such as diethyl thioether, diphenyl thioether, methyl phenyl thioether, ethylene sulfide, propylene sulfide; thioalcohols such as ethylthioalcohol, n-propylthioalcohol, thiophenol; etc. are illustrated. These electron donors may be employed alone or in admixture.

As the electron acceptors, halides of elements of III~VII Groups of the Periodic Table are employed. As for concrete examples, anhydrous aluminum chloride, silicon tetrachloride, stannous chloride, stannic chloride, titanium tetrachloride, zirconium tetrachloride, phosphorus trichloride, phosphorus pentachloride, vanadium tetrachloride, antimony pentachloride, iodine, etc. are mentioned. Among them, titanium tetrachloride is preferable.

As for the solvent, n-pentane, n-hexane, n-heptane, n-octane, i-octane, benzene, toluene, xylene, carbon tetrachloride, chloroform, 1,2-dichloroethane, methyl iodide, trichloroethylene, tetrachloroethylene, etc. may be employed. They may be also employed as washing solvents.

The solid product obtained by reacting the reduction solid with an electron donor and an electron acceptor may be, after completion of the reaction, separated from the reaction liquid by filtering off or decantation, washed with a solvent and used in the subsequent step as it is suspended in the solvent, or taken out as a dry solid and used in the subsequent step.

The resulting solid product is then preactivated in combination with an organoaluminum, an α-olefin and a reaction product of an organoaluminum compound with an electron donor.

The organoaluminum compounds employed in combination with the solid product or in the reaction with an electron donor may be the same as those mentioned in the reduction of $TiCl_4$, but the respective organoaluminum compounds employed in the reduction of $TiCl_4$, the combination with the solid product and the reaction with an electron donor are not always necessary to be the same, but may be different.

The most preferable organoaluminum compounds to be combined in these respective cases may be dialkylaluminum monohalides for the reduction of $TiCl_4$, dialkylaluminum monohalides for the combination with the solid product and trialkylaluminums for the reaction with an electron donor, but other combinations may also be employed.

The α-olefins employed in the preactivation are straight chain monoolefins such as ethylene, propylene, butene-1, hexene-1, heptene-1, etc., branched chain monoolefins such as 4-methyl-pentene-1, 2-methyl-pentene-1, 3-methyl-butene-1, etc. and styrene, etc. These α-olefins may be the same as or different from those as the object of the regular polymerization (the term "regular" being hereinafter often employed for distinguishing the polymerization carried out in the presence of the preactivated catalyst, from the polymerization at the time of the preparation of the preactivated catalyst), and two or more thereof may be employed in admixture.

The electron donors employed for preparing the reaction product of an organoaluminum compound with an electron donor may be the same as those mentioned above in the reaction for obtaining the solid product, but are not always necessary to be the same as that employed for obtaining the solid product.

The reaction product of an organoaluminum compound with an electron donor, employed in the preactivation (this product being referred hereinafter as to reaction product D) may be prepared by reacting 0.1 to 5 g of an electron donor based on 1 g of an organoaluminum compound with this organoaluminum in the presence of a solvent in an amount of 10 to 5,000 ml based on each one gram of the electron donor and the organoaluminum compound at a temperature of $-30°$ C. to $+100°$ C. over a period of 10 minutes to 3 hours. Usually the reaction may be carried out by dropwise adding an electron donor diluted with a solvent to an organoaluminum compound diluted with a solvent.

The preactivation may be carried out in a hydrocarbon solvent such as propane, butane, n-pentane, n-hexane, n-heptane, benzene, toluene, etc. or in a liquefied α-olefin such as liquefied propylene, liquefied butene-1, etc., or in gaseous ethylene, propylene, etc. Further, hydrogen may be coexistent in the preactivation.

The preactivation may be carried out by admixing and reacting 0 to 50 l of a solvent, 0.1 to 500 g of an organoaluminum compound, 0 to 30 l of hydrogen, 0.01 to 1,000 g of an α-olefin and 100 to 6,000 mg of a reaction product (D), each based on 1 g of the solid product. The reaction may be carried out at 0° to 100° C. for one minute to 20 hours, and it is preferable to polymerize the α-olefin in an amount of 0.005 to 500 g based on 1 g of the solid product.

In the preactivation, polymer particles obtained in advance by slurry polymerization, bulk polymerization or gas phase polymerization may be also made coexistent. Such polymer may be the same as or different from α-olefin polymers as the regular polymerization object. The amount of the above polymer particles which may be made coexistent may be in the range of 0 to 5,000 g based on 1 g of the solid product.

The solvent or the α-olefin employed in the preactivation may be removed midway during the preactivation or after completion of the preactivation, by distilling off under reduced pressure or filtering off, and also a solvent may be added to the solid product, in an amount of 80 l or less per g of the solid product to suspend the product in the solvent.

There are various embodiments for the preactivation. Among them, important ones are illustrated as follows:

(1) an embodiment wherein the solid product is combined with an organoaluminum compound, and an α-olefin is added to react therewith, followed by adding a reaction product (D);

(2) an embodiment wherein the solid product is combined with an organoaluminum compound in the presence of an α-olefin to react the α-olefin therewith, followed by adding a reaction product (D);

(3) an embodiment wherein the solid product is combined with an organoaluminum compound and a reaction product (D) is then added, followed by adding and reacting an α-olefin; and (4) an embodiment wherein the embodiment (3) is followed by further adding the reaction product (D). Further concrete examples of the above embodiments (1) and (2) are as follows:

(1-1) an embodiment wherein the solid product is combined with an organoaluminum compound, and an α-olefin is then reacted therewith in gas phase or in a liquefied α-olefin or in a solvent, followed by removing unreacted α-olefin or unreacted α-olefin and the solvent and then adding a reaction product (D);

(1-2) an embodiment wherein the reaction product (D) is added without removing unreacted α-olefin or unreacted α-olefin and the solvent, in the above embodiment (1-1);

(1-3) an embodiment wherein the reaction product (D) is added, and unreacted α-olefin or unreacted α-olefin and the solvent are then removed, in the above embodiment (1-2);

(1-4) an embodiment according to the above embodiments (1-1)~(1-3) but wherein an α-olefin polymer obtained in advance is added;

(1-5) an embodiment according to the above embodiments (1-1)~(1-4) but wherein after the preactivation, the solvent or the solvent and unreacted α-olefin are removed to obtain catalyst powder;

(2-1) an embodiment wherein the solid product is combined with an organoaluminum compound in the presence of propylene, a liquefied α-olefin or a gaseous α-olefin dissolved in a solvent to react such α-olefin therewith, followed by adding a reaction product (D);

(2-2) an embodiment according to the above embodiment (2-1) but wherein the combination is carried out in the presence of an α-olefin polymer obtained in advance; and (2-3) an embodiment according to the above embodiment (2) but wherein after the preactivation, unreacted α-olefin and the solvent are removed under reduced pressure to obtain catalyst powder. Further, in the above embodiments (1)~(4), it is possible to employ hydrogen together with the α-olefin. When the last component has been added and reacted, the preparation of the preactivated catalyst is complete, and there is no essential difference between the forms of the catalyst employed in the subsequent regular polymerization, i.e. between slurry form and powder form.

The preactivated catalyst prepared as mentioned above is then employed for producing α-olefin polymers. This polymerization may be carried out either according to slurry polymerization carried out in a hydrocarbon solvent such as n-hexane, n-heptane, n-octane, benzene, toluene, etc. or according to bulk polymerization carried out in a liquefied α-olefin such as liquefied propylene, liquefied butene, etc., but, in the present invention, since the catalyst is highly active, a remarkable effectiveness is exhibited particularly in the case of gas phase polymerization where an α-olefin such as ethylene, propylene, butene-1, etc. is polymerized in gas phase, and a desirable effectiveness is also exhibited in the case of as a modification of gas phase polymerization, slurry polymerization followed by gas phase polymerization or bulk polymerization followed by gas phase polymerization.

The gas phase polymerization of α-olefin may be carried out in the absence of a solvent such as n-hexane, n-heptane, etc., and besides, it may be also carried out in a state where a solvent is contained in an amount of 0 to 500 g based on 1 Kg of α-olefin polymer particles. Further, the gas phase may be carried out either continuously or batchwise. Furthermore it may be also carried out either in fluidized bed manner or in fluidized manner provided with agitating elements or with stirring with a vertical type or horizontal type paddle.

The embodiment of slurry polymerization followed by gas phase polymerization includes, for example, a batchwise polymerization wherein an α-olefin is polymerized in a solvent such as n-hexane, and the solvent is then distilled off under reduced pressure, followed by gas phase polymerization of the α-olefin; a continuous polymerization wherein an α-olefin is polymerized in a solvent and this polymerization is continued without distilling off the solvent and continuously transferred to gas phase polymerization; and a continuous polymerization wherein gas phase polymerization is carried out in the presence of a solvent but so that the content of the solvent is 500 g or less based on 1 Kg of the polymer particles. A plural stage polymerization reaction consisting of a combination of slurry polymerization and gas phase polymerization affords desirable results particularly in the case of continuous polymerization. In this embodiment, slurry polymerization is carried out in the first stage wherein the polymerization is so continued that the slurry concentration $$\left( \frac{\text{polymer (Kg)}}{\text{polymer (Kg)} + \text{solvent (Kg)}} \times 100\% \right)$$

is 70% or higher, or wherein the polymerization is first carried out so as to give a slurry concentration of 30 to 50%, followed by removing the solvent to give a slurry concentration of 70% or higher, and gas phase polymerization of the α-olefin is then carried out in the second stage. In this embodiment, the catalyst is added in the first stage slurry polymerization, and in the gas phase polymerization successively carried out after the slurry polymerization, it may be sufficient that the catalyst added in the former stage is used as it is, but, in this case, a fresh catalyst may be added in the second stage. The proportion of the polymer formed in the slurry polymerization to that formed in the gas phase polymerization is preferably in the range of 0.1 to 100 (by weight) of gas phase polymerization based on 1 (by weight) of slurry polymerization.

The embodiment of bulk polymerization of α-olefin followed by gas phase polymerization may be carried out either batchwise or continuously and in this embodiment, bulk polymerization is first carried out in a liquefied α-olefin monomer in the absence of solvent such as propane, n-hexane, etc. or in the presence of such a solvent in an amount of 20% by weight or less based on the weight of the α-olefin in the first stage, the gas phase polymerization of the α-olefin is then carried out in the second stage. In this embodiment, after the bulk polymerization of the first stage, the polymerization is continuously transferred to gas phase polymerization while the liquefied monomer is polymerized; or after the bulk polymerization, the liquefied monomer is removed so that the content of polymer particles $$\left( \frac{\text{polymer (Kg)}}{\text{polymer (Kg)} + \text{liquefied monomer (Kg)}} \times 100\% \right)$$

is 70% or higher, and gas phase polymerization is then carried out in the second stage. In this embodiment, the catalyst is added in the bulk polymerization of the first stage, and in the gas phase polymerization successively carried out after the bulk polymerization, it may be sufficient that the catalyst of the former stage is used as it is, but, in this case, a fresh catalyst may be added in the second stage. The proportion of the polymer formed in the bulk polymerization to that formed in the gas phase polymerization is preferably in the range of 0.1 to 100 (by weight) of gas phase polymerization based on 1 (by weight) of bulk polymerization.

Any of the slurry polymerization, bulk polymerization and gas phase polymerization may be carried out at a polymerization temperature of room temperature (20° C.) to 200° C. and a polymerization pressure of atmospheric pressure (0 Kg/cm$^2$G) to 50 Kg/cm$^2$G and usually for about 5 minutes to 10 hours. Addition of an adequate amount of hydrogen and the like means in this polymerization are the same as those in the case of conventional polymerization processes.

Examples of the α-olefins used in the process of the present invention are straight chain monoolefins such as propylene, butene-1, hexene-1, octene-1, etc., branched chain monoolefins such as 4-methyl-pentene-1, 2-methylpentene-1, 3-methyl-butene-1, etc., diolefins such as butadiene, isoprene, chloroprene, etc., styrene, etc. According to the process of the present invention, these olefins are not only homopolymerized but may be copolymerized in combination with each other, e.g. in combination of propylene with ethylene, butene-1 with ethylene, propylene with butene-1. Further, α-olefins employed in the slurry polymerization or bulk polymerization of the first stage may be the same as or different from those employed in the gas phase polymerization of the second stage.

A first effectiveness of the present invention is that the catalyst activity is very high and α-olefin polymers are obtained with a high yield. Namely, the polymer yield per g of the solid product amounts to 8,000 g in the case of slurry polymerization or bulk polymerization, and even in the case of gas phase polymerization where the monomer concentration is considerably lower than those in the above polymerizations, the yield amounts to 5,000 g to 8,000 g (polymer). Thus, it is possible to reduce the amount of catalyst used, not only in the slurry polymerization or bulk polymerization, but in the gas phase polymerization; hence even when the amount of alcohol, alkylene oxide, steam or the like employed for killing the catalyst after completion of the polymerization reaction or for purifying the resulting polymer is reduced, there is neither coloration of polymer nor degradation of physical properties of polymer nor bad influence of rusting molds at the time of molding the polymer, resulting in simplification of the process for purifying the polymer; reduction in the cost required for purifying the polymer; thus reduction in the production cost of the polymer.

A second effectiveness of the present invention is that the present invention has made it possible to produce α-olefin polymers with such a high yield even in case of gas phase polymerization process that exhibition of the inherent feature of the gas phase polymerization has become possible. Namely, there is a feature for gas phase polymerization process in the point that the cost for producing polymer is reduced, because the recovery and reuse of solvent and monomer can be minimized in the gas phase polymerization. This feature can be fully exhibited in the present invention. Further, since the polymer yield in the gas phase polymerization part has been increased, the processes of gas phase polymerization which is carried out after slurry polymerization or bulk polymerization, as a modification of gas phase polymerization, can be carried out with a good efficiency. Since gas phase polymerization is carried out in the latter part of the step, it has become possible to proceed to a gas phase polymerization after the polymer concentration is elevated up to 70% or higher in the former part of slurry polymerization or bulk polymerization followed by gas phase polymerization; hence it has become possible to effectively carry out vaporization of unreacted monomer by the polymerization reaction heat in the gas phase polymerization of the latter part of the step. Particularly in the bulk polymerization followed by gas phase polymerization, it has become possible to utilize the polymerization reaction heat very effectively.

A third effectiveness of the present invention is that highly crystalline α-olefin polymers can be obtained. For example, in the production of propylene polymers, isotactic polypropylene as n-hexane-insoluble (20° C.) amounts to 97 to 99.5 in terms of isotactic index (percentage of isotactic polymer in the total polymer formed). Thus, even when the removal step of atactic polymer is omitted, there is no disadvantage of e.g. lowering the physical properties, particularly rigidity of polymer; hence it is possible to simplify the production process of polymer.

A fourth effectiveness of the present invention is that polymers having a high bulk density amounting to 0.40 to 0.50 can be obtained. Thus, a small capacity polymerization vessel or storage vessel will do, resulting in reduction of the initial cost of a plant.

A fifth effectiveness of the present invention is that since the catalyst particles are uniform, the polymer particles are also uniform either in the case of gas phase polymerization alone, or in the case of combinations of slurry polymerization or bulk polymerization with gas phase polymerization; no cohesion of polymer particles are observed; and there occurs no clogging in the polymer discharge port from the polymerization vessel and the transportation line of polymer; hence a long term stabilized continuous operation is possible. Further, stabilizers and additives can be well dispersed; hence the dispersion of physical properties of product is reduced, resulting in further improved physical properties.

The present invention will be further illustrated by way of the following Examples.

EXAMPLE 1

(1) Preparation of Catalyst

Into a 500 ml capacity three-neck flask equipped with a stirrer, a cooler and a dropping funnel and having been purged with nitrogen gas were introduced 200 ml of n-hexane and 0.45 mol of TiCl$_4$, and after cooling down to −5° C., 0.45 mol of diethylaluminum monochloride diluted with 84 ml of n-hexane was dropwise added through the dropping funnel at −5° C. to 0° C. over 3 hours. After completion of the addition, the contents were kept at 70° C. for one hour to carry out reduction reaction, followed by cooling them down to room temperature (20° C.), removing the supernatant liquid by decantation, adding 250 ml of n-hexane, agitating the mixture for 30 minutes, allowing it to stand, three times repeating a procedure of removing the supernatant liquid and drying to obtain 69 g of a reduction solid, which was then suspended in 140 ml of n-hexane. To the resulting suspension was added 48 g of diisoamyl ether and reaction was carried out at 40° C. for one hour, followed by adding 200 ml of n-hexane, stirring for 30 minutes, allowing the mixture to stand, removing the supernatant liquid and drying to obtain 72 g of a solid, to which 280 ml of n-hexane and 7 g of diisoamyl ether were added and further 125 g of TiCl$_4$ was added, followed by reaction at 65° C. for 2 hours, cooling, filtering off in a dry box, 5 times washings with 50 ml of n-hexane and drying to obtain a solid product.

(2) Preparation of Preactivated Catalyst

Into a 2 l capacity stainless steel reactor equipped with agitating slant blades and having been purged with nitrogen gas were added 10 ml of n-hexane, 420 mg of diethylaluminum monochloride and 30 mg of the solid product obtained in the above item (1). The reactor was then closed and 200 ml of n-hexane containing 0.5 g of propylene was introduced through an introducing tube. Reaction was then carried out at 28° C. for 3 hours to obtain 0.1 g of reacted propylene (which corresponded to 3.3 g per g of the solid product), followed by adding 70 mg of a reaction product obtained by reacting 20 ml of n-hexane and 30 mg of triethylaluminum with 40 mg of hexamethylphosphoric acid triamide at 35° C. for 30 minutes to obtain a preactivated catalyst.

(3) Propylene Polymerization

Into a reactor containing the catalyst obtained above was introduced 150 ml of hydrogen, and a first stage polymerization was then carried out under a propylene partial pressure of 10 Kg/cm$^2$G, at a polymerization temperature of 70° C. for one hour to subject 78 g of propylene to slurry polymerization, followed by evacuating the reactor, and distilling off hydrogen, unreacted propylene and solvent. Thereafter 150 ml of hydrogen and 2 g of n-hexane were introduced and a gas phase polymerization reaction as a second stage polymerization was carried out under a propylene partial pressure of 21 Kg/cm$^2$G at 70° C. for 2 hours. After completion of the reaction, 5 g of methanol was introduced to carry out killing reaction at 70° C. for 10 minutes, followed by cooling down to room temperature (20° C.) and drying the resulting polymer to obtain 216 g of a white polymer. The polymer yield per g of the solid product was 7,200 g (2,600 g in the slurry polymerization and 4,600 g in the gas phase polymerization); the isotactic index (n-hexane insoluble at 20° C. (%)) was 98.0; the BD was 0.45; and the polymer particles were uniform and no agglomerate was observed. No coloration of polymer was observed and the yellowness index (YI) was 2.0.

COMPARATIVE EXAMPLE 1

Example 1 was repeated except that, in the preactivation of catalyst in Example 1, the reaction product of triethylaluminum with hexamethylphosphoric acid triamide was not added. The polymer yield was lower.

COMPARATIVE EXAMPLE 2

Example 1 was repeated except that, in the preactivation of catalyst in Example 1, after diethylaluminum monochloride and the solid product were added, the reaction product of triethylaluminum with hexamethylphosphoric acid triamide was added without reacting propylene. The polymerization activity of the resulting catalyst was low and the isotactic index of polymer was also low.

COMPARATIVE EXAMPLE 3

Example 1 was repeated except that, in the preactivation of catalyst, triethylaluminum and hexamethylphosphoric acid triamide were separately added without reacting them in advance. The polymerization activity of the resulting catalyst was low and the isotactic index was also low.

EXAMPLE 2

A preactivated catalyst was obtained in the same manner as in the item (2) of Example 1. Thereafter n-hexane was distilled off under reduced pressure to leave powder, followed by introducing 300 ml of hydrogen and 300 g of propylene and carrying out bulk polymerization under a propylene partial pressure of 32 Kg/cm$^2$G at 70° C. for 30 minutes to polymerize 40 g of propylene. The resulting slurry containing unreacted propylene was flushed into a 20 l capacity fluidized bed reactor of 20 cm in diameter equipped with agitating elements, and gas phase polymerization reaction was carried out under a propylene partial pressure of 21 Kg/cm$^2$G (which was maintained by feeding fresh propylene since the pressure lowered with the progress of polymerization), at a reaction temperature of 70° C. for 3 hours, while propylene was circulated at a flow rate of 5 cm/sec. and polymer was fluidized. After completion of the reaction, post-treatment was carried out in the same manner as in Example 1 to obtain a polymer (this applies also to the succeeding Examples).

COMPARATIVE EXAMPLE 4

Bulk polymerization and gas phase polymerization were carried out in the same manner as in Example 2 except that a powdery catalyst obtained in the same manner as in Comparative example 1 was used.

EXAMPLE 3 n-Hexane (45 ml), diethylaluminum monochloride (380 mg) and the solid product obtained in Example 1 (42 mg) were introduced in a reactor, and further the polymer obtained in Example 1 (5 g) was introduced. Reaction was then carried out under a propylene partial pressure of 5 Kg/cm$^2$G at 20° C. for 5 minutes (reacted propylene: 30 g per g of the solid product), followed by adding a reaction product obtained by reacting 20 mg of triethylaluminum with 20 mg of methyl toluylate in 10 ml of n-hexane at 30° C. for 20 minutes to prepare a preactivated catalyst. Hydrogen (180 ml) was introduced and a propylene gas phase polymerization was carried out under a propylene partial pressure of 24 Kg/cm$^2$G at 72° C., for 2.5 hours.

COMPARATIVE EXAMPLE 5

Example 3 was repeated except that, in the preactivation of catalyst in Example 3, the reaction product of triethylaluminum with methyl toluylate was not added.

EXAMPLE 4

Example 3 was repeated except that, in the preactivation in Example 3, a reaction product of triisobutylaluminum (28 mg) with N,N,N',N'-tetramethylhexaethylenediamine (30 mg) was employed in place of the reaction product of triethylaluminum (20 mg) with methyl toluylate (20 mg).

EXAMPLE 5

Hydrogen (180 ml) was added to a preactivated catalyst prepared in the same manner as in Example 3 and in the same amount as in the Example, and bulk polymerization was carried out under a propylene partial pressure of 26 Kg/cm$^2$G, at 60° C. for 40 minutes. Unreacted liquefied propylene was then transferred to a separate feed tank connected to the reactor. The temperature of the reactor was elevated up to 72° C., and a gas phase polymerization was carried out for 2 hours, while propylene was fed to the reactor through the feed tank so as to give a propylene partial pressure of 26 Kg/cm$^2$G.

COMPARATIVE EXAMPLE 6

Example 5 was repeated except that the catalyst of Comparative example 5 was employed.

EXAMPLE 6

A preactivated catalyst was prepared in the same manner as in Example 5, and bulk polymerization was carried out employing the catalyst, under a propylene partial pressure of 26 Kg/cm$^2$G, at 60° C., for 40 minutes. Thereafter, the temperature was elevated up to 70° C. to give a propylene partial pressure of 32 Kg/cm$^2$G, which, however, lowered down to 27 Kg/cm$^2$G after 40 minutes, and the bulk polymerization was transferred to gas phase polymerization. Thereafter the polymerization was carried out for further 60 minutes under a propylene partial pressure of 27 Kg/cm$^2$G while propylene was fed.

COMPARATIVE EXAMPLE 7

Example 6 was repeated except that the catalyst of Comparative example 5 was employed.

EXAMPLE 7 n-Hexane (100 ml), di-n-propylaluminum monochloride (300 mg) and the solid product obtained in Example 1 (50 mg) were mixed together, and hydrogen (15 ml) was introduced. Propylene was then reacted under a propylene partial pressure of 1 Kg/cm$^2$G, at 35° C. for 10 minutes (reacted propylene: 0.8 g per g of the solid product). After unreacted propylene, hydrogen and n-hexane were removed under reduced pressure, a reaction product obtained by reacting 120 mg of tri-n-octylaluminum with 26 mg of pyridine in 50 ml of n-hexane at 20° C. for 30 minutes was added to prepare a preactivated catalyst. Hydrogen (240 ml) was then added to the catalyst, and polymerization was carried out under a propylene partial pressure of 18 Kg/cm$^2$G at 68° C. The initial state was slurry polymerization, but after 30 minutes, a state where the solvent became occluded in polymer particles was brought; thus the slurry polymerization moved to gas phase polymerization. This gas phase polymerization was continued further for 1.5 hour.

COMPARATIVE EXAMPLE 8

Example 7 was repeated except that, in the preactivation of catalyst in Example 7, the reaction product of tri-n-octylaluminum with pyridine was not added.

EXAMPLE 8 n-Pentane (60 ml), di-n-butylaluminum monochloride (180 mg) and the solid product obtained in Example 1 were mixed together, and hydrogen (100 ml) was added. Reaction was then carried out under a propylene partial pressure of 5 Kg/cm$^2$G, at 60° C. for 20 minutes (reacted propylene: 240 g per g of the solid product). After unreacted propylene and hydrogen were purged, a reaction product obtained by reacting 100 mg of n-butylaluminum with 110 mg of diphenyl ether at 30° C. for 40 minutes in 20 ml of n-pentane was added as it was a reaction liquid to prepare a preactivated catalyst. Hydrogen (210 ml) was added to this catalyst, and slurry polymerization was carried out under a propylene partial pressure of 10 Kg/cm$^2$G, at 70° C. for one hour, to make the slurry concentration 72%. Thereafter the resulting polymer containing the solvent was introduced into the fluidized bed reactor employed in Example 2, and gas phase polymerization was carried out under a propylene partial pressure of 22 Kg/cm$^2$G at 70° C. for 2 hours, while the polymer was fluidized.

COMPARATIVE EXAMPLE 9

Example 8 was repeated except that, in the preactivation of catalyst in Example 8, the reaction product of tri-n-butylaluminum with diphenyl ether was not added.

EXAMPLE 9 n-Pentane (4 ml), diethylaluminum monochloride (190 mg), polypropylene (8 g) obtained by bulk polymerization, and the solid product obtained in Example 1 (29 mg) were mixed together, and n-pentane was distilled off under reduced pressure to leave powder. Propylene was then reacted under a propylene partial pressure of 3 Kg/cm$^2$G, at 20° C. for 20 minutes (reacted propylene: 1.2 g per g of the solid product). After unreacted propylene was purged, a reaction product obtained by reacting n-pentane (5 ml), triethylaluminum (80 mg) and N,N,N',N'-tetramethylurea (75 mg) at 20° C. for 10 minutes was added, followed by again removing n-pentane under reduced pressure to obtain a powdery preactivated catalyst. With this catalyst, propylene polymerization was carried out in the same manner as in Example 2.

COMPARATIVE EXAMPLE 10

Example 9 was repeated except that, in the preactivation of catalyst in Example 9, the reaction product of triethylaluminum with N,N,N',N'-tetramethylurea was not added.

EXAMPLE 10

A preactivated catalyst was prepared in the same manner as in Example 1. After propylene slurry polymerization of the first stage and distilling off under reduced pressure were carried out, ethylene polymerization as a second stage gas phase polymerization was carried out under a hydrogen partial pressure of 8 Kg/cm$^2$G and an ethylene partial pressure of 12 Kg/cm$^2$G at 70° C. for 2 hours to effect a propylene-ethylene block copolymerization.

EXAMPLE 11

Example 2 was repeated except that an α-olefin mixture of propylene (300 g) with ethylene (50 g) was employed in place of propylene (300 g), to obtain a polymer (a propylene-ethylene copolymer).

EXAMPLE 12

Example 11 was repeated except that butene-1 (80 g) was employed in place of ethylene (50 g), to obtain a polymer (a propylene-butene-1 copolymer).

EXAMPLE 13

Ethylene gas phase polymerization was carried out employing a preactivated catalyst prepared in the same manner as in Example 3, under a hydrogen partial pressure of 12 Kg/cm$^2$G at 85° C. for 2.5 hours.

EXAMPLE 14

Example 7 was repeated except that, in the preactivation, ethylene was employed in place of propylene (the amount of ethylene reacted, per g of the solid product in this case: 2.4 g).

EXAMPLE 15

Example 7 was repeated except that, in the preactivation, butene-1 was reacted in place of reacting propylene, under a butene partial pressure of 0.5 Kg/cm$^2$G at 35° C. for 10 minutes (the amount of butene-1 reacted, per g of the reaction product in this case: 0.3 g).

EXAMPLE 16

A solution consisting of n-hexane (70 ml) and di-n-butylaluminum monochloride (0.1 mol) was added to a solution consisting of toluene (357 ml) and TiCl$_4$ (0.8 mol) at 25° C. over 30 minutes, and the mixture was kept at the same temperature for 60 minutes, followed by removing the supernatant liquid by decantation, twice repeating a procedure of adding 200 ml of toluene and removing the supernatant liquid, thereafter adding toluene so as to give a total volume of 300 ml, to obtain a suspension of 38 g of a reduction solid, to which 114 g of TiCl$_4$ and 48 g of diisoamyl ether were almost simultaneously, followed by reaction at 75° C. for 1.5 hour. After completion of the reaction, cooling, washing with n-hexane and drying were carried out in the same manner as in Example 1, to obtain a solid product, after which a preactivation of catalyst (the amount of propylene reacted, per g of the solid product: 3.1 g) and propylene polymerization were carried out in the same manner as in Example 1.

EXAMPLE 17

The solid product obtained in Example 16 (25 mg) and diethylaluminum monochloride (240 mg) were introduced into n-hexane (1,000 ml), and further a reaction product obtained by reacting triethylaluminum (23 mg) with methyl toluylate (30 mg) in n-hexane (30 ml) at 25° C. for 10 minutes was added. Propylene (0.02 g) was then reacted under a propylene partial pressure of 1 Kg/cm$^2$G at 15° C. for 10 minutes (the amount of propylene reacted, per g of the reaction product: 0.8 g). Unreacted propylene was then purged to obtain a suspension of a preactivated catalyst, to which 150 ml of hydrogen was then added, followed by slurry polymerization of propylene under a propylene partial pressure of 10 Kg/cm$^2$G at 70° C. for 4 hours. After completion of the polymerization reaction, n-hexane was removed by steam stripping.

COMPARATIVE EXAMPLE 11

Example 17 was repeated except that, in the preactivation of catalyst in Example 17, the reaction product of triethylaluminum with methyl toluylate was not added.

COMPARATIVE EXAMPLE 12

Example 17 was repeated except that, in the preactivation of catalyst in Example 17, the preactivation with propylene under a propylene partial pressure of 1 Kg/cm$^2$G at 15° C. was not carried out.

EXAMPLE 18

The solid product obtained in Example 16 (18 mg) and triethylaluminum (180 mg) were introduced into n-heptane (1,000 ml), and 0.04 g of propylene was then reacted under a propylene partial pressure of 1.5 Kg/cm$^2$G at 20° C. for 10 minutes (the amount of propylene reacted, per g of the solid product: 2.2 g). Further a reaction product obtained by reacting triisobutylaluminum (40 mg) with hexamethylphosphoric acid triamide (36 mg) in n-hexane (20 ml) at 20° C. for 20 minutes was added, to obtain a suspension of a preactivated catalyst. With this catalyst, an ethylene slurry polymerization was carried out under a hydrogen partial pressure of 5 Kg/cm$^2$G and an ethylene partial pressure of 6 Kg/cm$^2$G, at 85° C. for 4 hours, and n-hexane was then removed by steam stripping.

EXAMPLE 19

Example 3 was repeated except that, in the preparation of the reaction product of an organoaluminum with an electron donor, di-n-butylaluminum (88 mg) and methyl toluylate (75 mg) were employed in place of triethylaluminum (20 mg) and methyl toluylate (20 mg). The amount of propylene reacted in the preactivation was 2.5 g per g of the solid product.

COMPARATIVE EXAMPLE 13

Propylene polymerization was carried out in the same manner as in Example 19 except that, in the catalyst preparation of Example 19, a catalyst prepared by almost simultaneously adding di-n-butylaluminum monochloride and methyl toluylate was employed in place of the reaction product of di-n-butylaluminum monochloride with methyl toluylate.

EXAMPLE 20

Example 1 was repeated except that triethylaluminum (68 mg) and ethyl benzoate (18 mg) were employed in place of triethylaluminum (30 mg) and hexamethylphosphoric acid triamide (40 mg). The amount of propylene reacted in the preactivation was 2.8 g per g of the solid product.

EXAMPLE 21

Example 16 was repeated except that di-n-butyl ether (32 g) was employed in place of diisoamyl ether (48 g). The amount of propylene reacted in the preactivation was 3.2 g per g of the solid product.

EXAMPLE 22

The reduction solid (69 g) obtained in the item (1) of Example 1 was suspended in 100 ml of toluene, and TiCl$_4$ (200 g) and di-n-butyl ether (80 g) were added. Reaction was then carried out at 80° C. for one hour, followed by cooling, filtering off in a dry box and 5 times washings with 100 ml of n-hexane to obtain a solid product. Thereafter a preactivation (the amount of propylene reacted: 3.8 g per g of the solid product: 3.8 g) and a propylene polymerization were carried out in the same manner as in the items (2) and (3) of Example 1.

The results of the foregoing Examples and Comparative examples are summarized in the following Table:

TABLE

| No. of Examples and Compar. exs. | Polymer yield per g of solid product (g) | Iso-tactic index | BD of poly-mer | 4 Mesh on (% by weight) | MFR* | YI** |
|---|---|---|---|---|---|---|
| Example 1 | 7,200 | 98.0 | 0.45 | 0 | 4.2 | 2.0 |
| Comp. ex. 1 | 3,200 | 98.5 | 0.45 | 0 | 3.6 | 7.5 |
| Comp. ex. 2 | 3,800 | 89.4 | 0.40 | 9 | 3.6 | 13.8 |
| Comp. ex. 3 | 2,400 | 88.4 | 0.38 | 14 | 4.5 | 17.0 |
| Example 2 | 7,800 | 98.1 | 0.45 | 0 | 6.2 | 2.5 |
| Comp. ex. 4 | 3,400 | 98.5 | 0.45 | 0 | 3.8 | 6.9 |
| Example 3 | 6,400 | 99.5 | 0.45 | 0 | 5.3 | 2.0 |
| Comp. ex. 5 | 2,900 | 99.0 | 0.45 | 0 | 2.9 | 8.0 |
| Example 4 | 7,100 | 98.5 | 0.44 | 0 | 5.1 | 2.1 |
| Example 5 | 7,300 | 98.6 | 0.46 | 0 | 4.8 | 1.9 |
| Comp. ex. 6 | 3,200 | 98.6 | 0.45 | 0 | 4.1 | 7.8 |
| Example 6 | 7,100 | 98.8 | 0.43 | 0 | 4.2 | 2.5 |
| Comp. ex. 7 | 3,000 | 98.8 | 0.41 | 0 | 4.0 | 8.2 |
| Example 7 | 6,900 | 99.0 | 0.47 | 0 | 1.9 | 2.1 |

TABLE-continued

| No. of Examples and Compar. exs. | Polymer yield per g of solid product (g) | Isotactic index | BD of polymer | 4 Mesh on (% by weight) | MFR* | YI** |
|---|---|---|---|---|---|---|
| Comp. ex. 8 | 2,900 | 98.5 | 0.45 | 0 | 2.8 | 8.5 |
| Example 8 | 7,700 | 98.5 | 0.45 | 0 | 2.9 | 2.5 |
| Comp. ex. 9 | 3,400 | 98.5 | 0.45 | 0 | 3.8 | 8.0 |
| Example 9 | 7,200 | 99.0 | 0.44 | 0 | 4.3 | 2.9 |
| Comp. ex. 10 | 3,300 | 98.0 | 0.42 | 0 | 4.1 | 8.5 |
| Example 10 | 7,900 | 97.0 | 0.46 | 0 | 2.8 | 2.0 |
| Example 11 | 7,800 | 97.0 | 0.44 | 0 | 4.1 | 2.2 |
| Example 12 | 7,900 | 97.8 | 0.44 | 0 | 4.5 | 2.1 |
| Example 13 | 7,200 | — | 0.48 | 0 | 3.2 | 2.0 |
| Example 14 | 7,300 | 99.1 | 0.46 | 0 | 3.8 | 2.5 |
| Example 15 | 7,000 | 99.1 | 0.45 | 0 | 3.9 | 2.1 |
| Example 16 | 7,400 | 99.0 | 0.46 | 0 | 3.8 | 1.8 |
| Example 17 | 5,900 | 98.5 | 0.45 | 0 | 4.8 | 3.2 |
| Comp. ex. 11 | 2,400 | 98.5 | 0.45 | 0 | 4.3 | 11.6 |
| Comp. ex. 12 | 1,800 | 98.0 | 0.32 | 14 | 4.1 | 18.5 |
| Example 18 | 7,300 | — | 0.44 | 0 | 0.95 | 2.1 |
| Example 19 | 6,200 | 99.0 | 0.45 | 0 | 3.8 | 2.5 |
| Comp. ex. 13 | 3,100 | 97.2 | 0.43 | 0 | 3.9 | 10.5 |
| Example 20 | 8,000 | 99.4 | 0.49 | 0 | 3.8 | 1.9 |
| Example 21 | 7,000 | 99.0 | 0.47 | 0 | 3.9 | 1.8 |
| Example 22 | 7,000 | 98.0 | 0.45 | 0 | 4.1 | 2.6 |

*MFR: Melt flow rate (according to ASTM D-1238(L))
**YI: Yellowness index (according to JIS K7103)

What is claimed is:

1. A process for producing ethylene and/or propylene polymers which comprises polymerizing ethylene and/or propylene at 20° to 200° C. under 0 to 50 Kg/cm²G, for 5 minutes to 10 hours, in the presence of a preactivated catalyst obtained by:
    (a) obtaining a solid product by reacting together at a temperature of −50° C. to 200° C. and for 10 minutes to 10 hours:
        (1) 100 g of a reduction solid,
        (2) 79 to 126 g of an electron donor, and
        (3) 181 to 300 g of an electron acceptor,
    said reduction solid being prepared by reducing $TiCl_4$ with an organoaluminum compound having a formula $Al.R_nR'_{n'}X_{3-(n+n')}$, wherein R, R' are hydrocarbon radical with from 1 to 10 carbon atoms or alkoxy radical with from 1 to 2 carbon atoms, X is a halogen, and n, n' are optional numbers contained in the formula $0.0 < n+n' \leq 3$
    said electron donor being an organic substance having one or more atoms selected from O, N, S or P,
    said electron acceptor being a halide of an element of Groups III-VII of the Periodic Table,
    (b) combining 1 g of said solid product with
        (1) 6.0 to 14 g of said organoaluminum compound, and
        (2) 0.3 to 240 g of an alpha-olefin having 2–8 carbon atoms, and
    at a temperature of 0° C. to 100° C. for 1 minute to 20 hours so as to thereby polymerize 0.005 to 500 g of said alpha-olefin per 1 g of said solid product
    (c) and adding 1 g of said solid product with 100 to 6,000 mg of the reaction product of trialkylaluminum having a formula $AlR_3$ (wherein R is hydrocarbon radical with from 1 to 10 carbon atoms) with said electron donor.

2. A process according to claim 1 wherein the polymerization of ethylene and/or propylene is carried out by way of gas phase polymerization.

3. A process according to claim 1 wherein the polymerization of ethylene and/or propylene is carried out by way of bulk polymerization followed by gas phase polymerization.

4. A process according to claim 1 wherein the polymerization of ethylene and/or propylene is carried out by way of slurry polymerization followed by gas phase polymerization.

5. A process according to claim 1 wherein in step (c) the organoaluminum compound is selected from the group consisting of
triethylaluminum,
tri-n-octylaluminum,
tri-n-butylaluminum, and
triisobutylaluminum,
    and the electron donor is selected from the group consisting of
hexamethylenephosphoric acid triamide,
pyridine,
diphenyl ether,
N,N,N;-N'-tetramethyl urea, and
methyl toluate.

* * * * *